(12) United States Patent
Lin et al.

(10) Patent No.: US 9,974,017 B1
(45) Date of Patent: May 15, 2018

(54) MOBILE DEVICE POWER MANAGEMENT

(71) Applicant: Google Inc., Mountain View, CA (US)

(72) Inventors: Victor Lin, Fremont, CA (US); Amol Tuli, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/669,819

(22) Filed: Aug. 4, 2017

(51) Int. Cl.
| G08C 17/00 | (2006.01) |
| H04W 52/02 | (2009.01) |
| H04W 68/02 | (2009.01) |
| H04W 76/04 | (2009.01) |

(52) U.S. Cl.
CPC ....... *H04W 52/0216* (2013.01); *H04W 68/02* (2013.01); *H04W 76/048* (2013.01)

(58) Field of Classification Search
CPC .......... H04W 52/0216; H04W 76/048; H04W 68/02
See application file for complete search history.

(56) References Cited

U.S. PATENT DOCUMENTS

| 7,266,085 | B2 | 9/2007 | Stine | |
| 2010/0067421 | A1* | 3/2010 | Gorokhov | H04W 52/0216 370/311 |
| 2010/0124223 | A1* | 5/2010 | Gibbs | H04W 28/06 370/389 |
| 2010/0332212 | A1 | 12/2010 | Finkelman | |
| 2011/0183663 | A1* | 7/2011 | Kenehan | H04W 76/048 455/423 |
| 2012/0083293 | A1* | 4/2012 | Bejerano | H04W 68/02 455/458 |
| 2012/0214502 | A1* | 8/2012 | Qiang | H04W 8/12 455/453 |
| 2014/0334366 | A1* | 11/2014 | Hsu | H04W 52/0225 370/311 |
| 2015/0341961 | A1* | 11/2015 | Kim | H04W 74/0808 370/338 |
| 2015/0358907 | A1* | 12/2015 | Berggren | H04W 52/0229 455/574 |
| 2016/0119881 | A1* | 4/2016 | Merlin | H04W 52/146 370/328 |
| 2016/0128102 | A1* | 5/2016 | Jauh | H04W 74/0833 370/329 |

(Continued)

FOREIGN PATENT DOCUMENTS

WO    WO-2014140408 A1    9/2014

*Primary Examiner* — Clemence Han
(74) *Attorney, Agent, or Firm* — Honigman Miller Schwartz and Cohn LLP

(57) ABSTRACT

A method includes executing a user equipment (UE) device in a doze mode, a peek mode, and a normal mode. The doze mode includes terminating any connections with a network, comparing a clock time with a maintenance window schedule of maintenance time windows, and executing the peek mode when the clock time is within a maintenance time window. The peek mode includes receiving a connection request from a mobility management entity (MME) system when the MME system has been notified of at least one buffered downlink packet addressed to the UE device, and executing the normal mode in response to receiving the connection request. The normal mode includes establishing a connection to the network and receiving the at least one buffered downlink packet.

20 Claims, 9 Drawing Sheets

(56) References Cited

U.S. PATENT DOCUMENTS

| | | | |
|---|---|---|---|
| 2016/0135231 A1* | 5/2016 | Lee | H04W 68/12 370/329 |
| 2016/0173377 A1* | 6/2016 | Rong | H04W 74/04 370/392 |
| 2016/0183305 A1* | 6/2016 | Huang | H04W 74/0833 370/329 |
| 2016/0198500 A1* | 7/2016 | Merlin | H04W 76/021 370/329 |
| 2016/0198514 A1* | 7/2016 | Wang | H04W 76/027 370/311 |
| 2016/0219522 A1* | 7/2016 | Asterjadhi | H04W 52/0274 |
| 2016/0227533 A1* | 8/2016 | Josiam | H04W 74/006 |
| 2016/0241411 A1* | 8/2016 | Huang | H04L 12/189 |
| 2016/0269993 A1* | 9/2016 | Ghosh | H04W 52/0229 |
| 2016/0270027 A1* | 9/2016 | Ang | H04W 68/02 |
| 2016/0302232 A1* | 10/2016 | Ghosh | H04W 74/0833 |

* cited by examiner

MOBILE DEVICE POWER MANAGEMENT

TECHNICAL FIELD

This disclosure relates to power management for mobile devices.

BACKGROUND

Wireless communication networks provide communication content such as voice, video, packet data, messaging, and broadcast for mobile devices and data terminals. The wireless communication network may include a number of base stations that can support communication for a number of user mobile devices. User equipment (e.g., a user mobile device) communicates with an external network through a base station via downlink and optionally an uplink.

To conserve power at battery-powered mobile devices while not actively communicating with the external network, mobile devices may operate in an idle state to only listen to paging messages from the external network that indicate information about incoming calls, system changes, and/or emergencies notifications. Mobile devices may further enable discontinuous reception (DRX) while in the idle state to further reduce battery power consumption. When DRX is enabled, a transceiver at the mobile device is turned off to conserve battery power and only periodically turns on to receive available data packets from the network. However, even when DRX is enabled, any downstream packets sent to the mobile device will cause the mobile device to wake up and operate in a full power mode by connecting to the external network. Periodical traffic patterns may therefore cause the mobile device to consume battery power by continuously operating in the full power mode or quickly cycling between idle and connected states.

SUMMARY

One aspect of the disclosure provides a method for operating user equipment (UE) in a doze mode, a peek mode, and a normal mode. The doze mode includes terminating any connections with the network, comparing a clock time of the data processing hardware with a maintenance window schedule of maintenance time windows, and executing the peek mode when the clock time is within a maintenance time window of the maintenance window schedule. The peek mode includes receiving a connection request from a mobility management entity (MME) system when the MME system has been notified of at least one buffered downlink packet addressed to the UE device, and executing the normal mode in response to receiving the connection request. The normal mode includes establishing a connection to the network, receiving the at least one buffered downlink packet, and executing the doze mode when the at least one buffered downlink packet has been received and the maintenance time window has lapsed.

Implementations of the disclosure may include one or more of the following optional features. In some implementations, the data processing hardware is in communication with a transceiver having connected state and an idle state, and terminating any connections with the network during the doze mode includes instructing the transceiver to enter the idle state, ceasing any communication operations. The doze mode may include notifying the MME system about executing the doze mode before instructing the transceiver to enter the idle state. In some examples, notifying the MME system about executing the doze mode includes delivering a non-access stratum message to the MME system indicating that the transceiver is about to enter the idle state. In other examples, notifying the MME system about executing the doze mode includes executing an over-the-top (OTT) application to deliver an out-of-band message to the MME system about executing the doze mode. Notifying the MME system about executing the doze mode may include delivering a doze mode notification to the MME system about executing the doze mode. The doze mode notification may include the maintenance window schedule of maintenance time windows.

In some examples, the doze mode includes monitoring a paging channel for any paging-qualified downlink packets available for the UE, where a paging-qualified downlink packet has a higher priority over any non-paging-qualified downlink packets and causes the MME system to transmit the connection request to the UE over the paging channel. In response to receiving a connection request over the paging channel to receive the paging-qualified downlink packet, executing the normal mode. The at least one buffered downlink packet may be buffered by a serving gateway (SGW) during the doze mode. Paging qualified packets should trigger the procedure to move UE from doze mode to normal mode immediately.

Another aspect of the disclosure provides a user equipment (UE) device including a transceiver, data processing hardware in communication with the transceiver, and memory hardware in communication with the data processing hardware. The memory hardware stores a maintenance window schedule of maintenance time windows and instructions that when executed on the data processing hardware cause the data processing hardware to perform operations that include executing the data processing hardware in a doze mode, a peek mode, and a normal mode. The doze mode includes terminating any connections with the network, stopping execution of applications, comparing a clock time of the data processing hardware with a maintenance window schedule of maintenance time windows, and executing the peek mode when the clock time is within a maintenance time window of the maintenance window schedule. The peek mode includes receiving a connection request from a mobility management entity (MME) system when the MME system has been notified of at least one buffered downlink packet addressed to the UE device, and executing the normal mode in response to receiving the connection request. The normal mode includes establishing a connection to the network, receiving the at least one buffered downlink packet, and executing the doze mode when the at least one buffered downlink packet has been received and the maintenance time window has lapsed.

This aspect may include one or more of the following optional features. For instance, this aspect may include extending a transceiver to support low power operation. In normal mode and peek mode, the transceiver should operate like a normal UE transceiver. In doze mode, the transceiver should drop any packets from both network and UE data processing hardware. In some implementations, the transceiver has a connected state and an idle state, and terminating any connections with the network during the doze mode includes instructing the transceiver to enter the idle state, ceasing any communication operations. The doze mode may include notifying the MME system about executing the doze mode before instructing the transceiver to enter the idle state. In some examples, notifying the MME system about executing the doze mode includes delivering a non-access stratum message to the MME system indicating that the transceiver is about to enter the idle state. In other examples, notifying the MME system about executing the doze mode includes executing an over-the-top (OTT) application to deliver an out-of-band message to the MME system about executing the doze mode. Notifying the MME system about executing the doze mode may include delivering a doze mode notification to the MME system about executing the doze mode. The doze mode notification may include the maintenance window schedule of maintenance time windows.

In some examples, the doze mode includes monitoring a paging channel for any paging-qualified downlink packets available for the UE, wherein a paging-qualified downlink packet has a higher priority over any non-paging-qualified downlink packets and causes the MME system to transmit the connection request to the UE over the paging channel. In response to receiving a connection request over the paging channel to receive the paging-qualified downlink packet, executing the normal mode. The at least one buffered downlink packet may be buffered by a serving gateway (SGW) or the MME during the doze mode. Thus, when the UE receives paging qualified packets by the SGW during the doze mode, the SGW should notify the MME and the MME should buffer the packet and initiate standard paging procedure.

Another aspect of the disclosure provides a method for transmitting a connection request to a user equipment (UE) device that is not connected to a network. The method includes receiving, at data processing hardware of the network, a data packet addressed to the UE device, and determining, by the data processing hardware, whether the UE device is connected to the network. When the UE device is connected to the network, the method includes delivering, by the data processing hardware, the data packet to the UE device. When the UE device is not connected to the network, the method includes buffering, by the data processing hardware, the data packet in memory hardware in communication with the data processing hardware, and comparing a clock time of the data processing hardware with a maintenance window schedule of maintenance time windows of the UE device. When the clock time is within a maintenance time window of the UE device, the method includes transmitting a connection request to the UE device over a paging channel, the connection request causing the UE device to establish a connection to the network.

Implementations of the disclosure may include one or more of the following optional features. In some implementations, when the UE device is not connected to the network, the method includes determining, by the data processing hardware, whether the data packet addressed to the UE device is paging-qualified classified, and transmitting the connection request to the UE device over the paging channel when the data packet addressed to the UE device is paging-qualified classified. The data packet addressed to the UE device may be paging-qualified classified when the data packet includes a standard initiation protocol packet addressed to the UE device or a standard messaging service packet addressed to the UE device. In some examples, when the data packet addressed to the UE device is not paging-qualified classified and the clock time is outside the maintenance time window of the UE device, the method includes buffer the downlink packet in MME but not initiate paging sequence. The packet will be delivered when the UE is back on normal or connected state.

In some examples, the method also includes receiving, at the data processing hardware, a doze mode notification from the UE device. The doze mode notification indicates that the UE device is entering a doze mode that causes the UE device to terminate any connections with the network for a doze period of time. In some configurations, receiving the doze mode notification from the UE device includes receiving the maintenance window schedule of maintenance time windows from the UE device, and storing the maintenance window schedule of maintenance time windows in the memory hardware.

Yet another aspect of the disclosure provides a method for transmitting a connection request to a user equipment (UE) device that is not connected to a network. The method includes receiving, at data processing hardware a doze mode notification from the UE device that indicates the UE device is entering a doze mode that causes the UE device to terminate any connections with a network for a doze period of time. The method also includes receiving, at the data processing hardware, a data packet addressed to the UE device, and determining, by the data processing hardware, whether the UE device is connected to the network. When the UE device is connected to the network, the method includes delivering the data packet to the UE device. When the UE device is not connected to the network, the method includes buffering, by the data processing hardware, the data packet in memory hardware in communication with the data processing hardware, and determining, by the data processing hardware, whether the data packet is paging-qualified classified. When the data packet is paging-qualified classified, the method includes transmitting, by the data processing hardware, a connection request to the UE device over a paging channel. The connection request causes the UE device to exit the doze mode and enter a normal mode during which the UE device establishes a connection to the network.

In some implementations, when the UE device is not connected to the network and the data packet is not paging-qualified classified, the method also includes comparing a clock time of the data processing hardware with a maintenance window schedule of maintenance time windows of the UE device, and when the clock time is within a maintenance time window of the UE device, transmitting the connection request to the UE device over the paging channel. Additionally, when the data packet addressed to the UE device is not paging-qualified classified and the clock time is outside the maintenance time window of the UE device, the method may also include ceasing any communication with the UE device over the paging channel.

In some examples, the data packet addressed to the UE device is paging-qualified classified when the data packet is indicative of an incoming call for the UE device. Receiving the doze mode notification from the UE device may include receiving a non-access stratum message from the UE device through the network, the non-access stratum message including the doze mode notification. Alternatively, receiving the doze mode notification from the UE device may include receiving an out-of-band message from an over-the-top (OTT) application executing on the user device, the out-of-band message including the doze mode notification. In some examples, receiving the doze mode notification from the UE device includes receiving the maintenance window schedule of maintenance time windows from the UE device, and storing the maintenance window schedule of maintenance time windows in the memory hardware.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Implementations herein are directed toward a user equipment (UE) device informing components, such as a mobility management entity (MME) and a serving gateway (SGW), of an evolved packet core that the UE device is about to enter a doze mode and terminate any connections with a network for a doze period of time. During the doze mode, the SGW may buffer any downlink data packets addressed to the UE device from an external network (e.g., the Internet) and the MME may forego paging the UE device to notify the UE device of the received downlink data packet until a clock time is within a maintenance time window. The UE device may periodically enter a peek mode during the maintenance time window to receive the notification of the buffered data packet over a paging channel from the MME. In response to receiving the notification during the maintenance time window, the UE device may establish a connection with the network to receive the buffered data packet. Accordingly, the UE device is able to conserve battery consumption while in the doze mode by not connecting to the network during the doze period of time and the MME is instructed to not page the UE device when data packets are received unless the clock time is within the maintenance time window. However, for downlink data packets addressed to the UE device that are paging-qualified downlink packets, the MME will immediately page the UE regardless of whether or not the UE device is in the doze mode. Here, a paging-qualified downlink packet may correspond to a high priority data packet, such as an incoming call. Accordingly, a paging-qualified downlink packet will trigger the MME device to immediately page the UE device to exit the doze mode and establish a connection with the network to receive the paging-qualified downlink packet.

Figure 1:
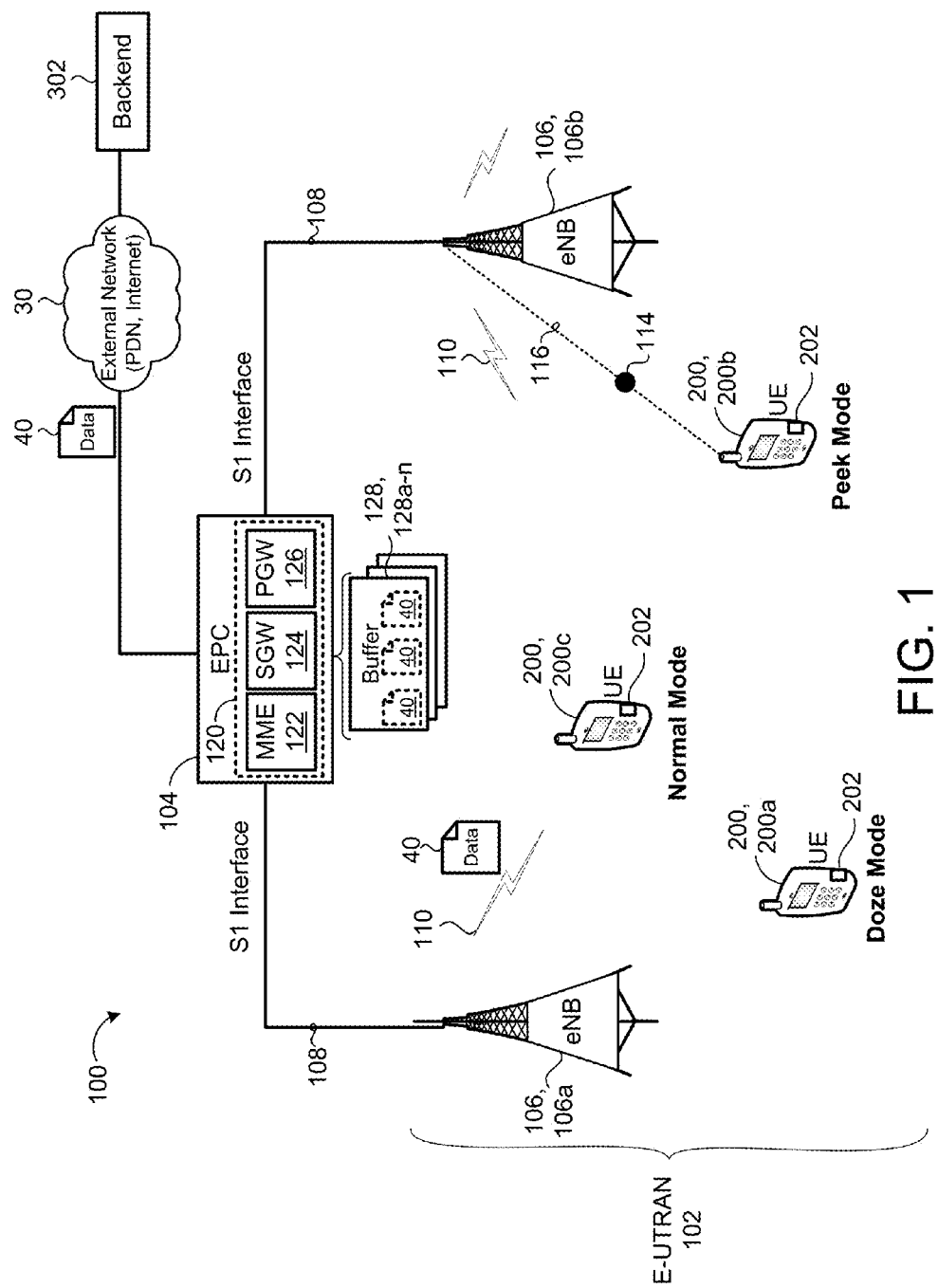
FIG. 1 is a schematic view of an example wireless network including an evolved packet core in communication with user equipment via one or more base stations.

FIG. 1 shows a communication network 100, which may be a Long-Term Evolution (LTE) network and/or a multiple access network supporting numerous access technologies specified by the 3$^{rd}$ Generation Partnership Project (3GPP), such as the General Packet Radio Service (GPRS), the Global System for Mobile Communications/Enhanced Data Rates for GSM Evolution (GSM/EDGE), the Universal Mobile Telecommunication System/High Speed Packet Access (UMTS/HSPA), LTE and LTE advanced network technologies. LTE is a standard for wireless communication of high-speed data packets 40 between User Equipment (UE) devices 200, 200a-n, such mobile phones and data terminals, and base stations 106, 106a-b. LTE is based on the GSM/EDGE and UMTS/HSPA network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD).

In the example shown, the UE devices 200 communicate with an external network 30 through the LTE network 100. The external network 30 may include a packet data network (PDN), which may be the Internet. The network 100 includes a first portion, an Evolved Universal Terrestrial Radio Access Network (e-UTRAN) portion 102, and a second portion, an Evolved Packet Core (EPC) portion 104. The first portion 102 includes an air interface 110 (i.e., Evolved Universal Terrestrial Radio Access (e-UTRA)) of 3GPP's LTE upgrade path for mobile networks, UE devices 200, and multiple base stations 106. The LTE air interface 110 uses orthogonal frequency-division multiple access (OFDMA) radio-access for the downlink and Single-carrier FDMA (SC-FDMA) for the uplink. Accordingly, the first portion 102 provides a radio access network (RAN) that supports radio communication of data packets 40 and/or other surfaces from the external network 30 to the UE devices 200 over the air interface 110 via one or more base station 106. The data packets 40 may be related to downloads from the Internet 30 and/or Voice-over-IP (VoIP) communications addressed to a specific UE device 200.

The EPC 104 provides a framework configured to converge voice and data on the LTE network 100. The EPC 104 unifies voice and data on an Internet Protocol (IP) service architecture and voice is treated as just another IP application. The EPC 104 includes several key components 120 that include, without limitations, a Mobility Management Entity (MME) 122, a Serving Gateway (SGW) 124, and a Packet Data Node Gateway (PGW) 126. The MME 122, the SGW 124, and the PGW 126 may be standalone components 120, or at least two of the components 120 may be integrated together. The EPC 104 communicates with the external network 30 to receive downstream data packets 40 addressed to UE devices 200 of the network 100.

The MME 122 is a key control-code for the LTE network 100. The MME 122 manages sessions and states and authenticates and tracks a UE device 200 across the network 100. For instance, the MME 122 may perform various functions such as, but not limited to, control of signaling and security for a Non-Access Stratum (NAS), authentication and mobility management of UE devices 200, selection of gateways for UE devices 200, and bearer management functions. The SGW 124 performs various functions related to IP data transfer for user devices 200 such as data routing and forwarding, as well as mobility anchoring. The SGW 124 may perform functions such as buffering, routing, and forwarding of data packets 40 for user devices 200. The PGW 126 is an interface between the LTE network 100 and the external network 30 (e.g., PDN), manages quality of service (QoS), and provides deep packet inspection (DPI).

Each base station 106 may include an evolved Node B (also referred as eNode B or eNB). An eNB 106 includes hardware that connects to the air interface 110 (e.g., a mobile phone network) for communicating directly with the UE devices 200. For instance, the eNB 106 may transmit downlink LTE signals (e.g., communications) to the UE devices 200 and receive uplink LTE signals from the UE devices 200 over the air interface 110. The eNBs 106 use an S1 interface 108 for communicating with the EPC 104. The S1 interface 108 may include an S1-MME interface for communicating with the MME 122 and an S1-U interface for interfacing with the SGW 124. Accordingly, the S1 interface 108 is associated with a backhaul link for communicating with the EPC 104.

UE devices 200 may be any telecommunication device that is capable of transmitting and/or receiving voice/data over the network 100. UE devices 200 may include, but are not limited to, mobile computing devices, such as laptops, tablets, smart phones, and wearable computing devices (e.g., headsets and/or watches). UE devices 200 may also include other computing devices having other form factors, such as computing devices included in desktop computers, vehicles, gaming devices, televisions, or other appliances (e.g., networked home automation devices and home appliances).

In some implementations, each UE device 200 includes data processing hardware 202 that executes in a doze mode, a peek mode, and a normal mode. Each UE device 200 may notify the EPC 104 when the UE device 200 has, or is about to, exit the normal mode and enter the doze mode. FIG. 1 shows the UE device 200a executing in the doze mode to operate the UE device 200a in a lower power state to reduce power consumption, and thereby conserve battery power of the UE device 200a. Namely, the doze mode causes the UE device 200a to terminate any connections with the network 100. As used herein, the UE device 200a terminates connections with the network 100 by releasing Radio Resource Control (RRC) connections with the network 100 such that no communication bearer in a control plane is established with the network 100 via a serving base station 106. Accordingly, a transceiver 204 (FIG. 2) of the UE device 200a enters and operates in an idle state to conserve power consumption at the UE device 200a during the doze mode.

While the UE device 200a may receive connection requests 114 over a paging channel 116 during the doze mode that will cause the UE device 200a to exit the doze mode and enter the connection mode, the MME 122 will forego sending any connection requests 114 to the UE device 200a until the UE device 200a is in the peek mode or the SGW 124 determines a received downstream data packet 40 addressed to the UE device 200a is paging-qualified classified. Thus, when the SGW 124 receives a downstream data packet 40 addressed to the UE device 200a that is not paging-qualified classified, the SGW 124 will buffer the received downstream data packet 40 in memory hardware 123 (FIGS. 3A and 3B) at the SGW 124 and the MME 122 will forego notifying the UE device 200a (i.e., forego sending the connection request 114 over the paging channel 116) until the UE device 200a is executing in the peek mode. The SGW 124 may maintain a corresponding buffer 128, 128a-n of received downstream data packets 40 for each UE device 200 the SGW 124 serves.

In some examples, the data processing hardware 202 of the UE device 200b executes in the peek mode during a maintenance time window 218 (FIG. 2) of the UE device 200b. For instance, the UE device 200b may exit from the doze mode and enter the peek mode during the maintenance time window 218. The peek mode includes the UE device 200b receiving the connection request 114 from the MME 122 over the paging channel 116 when the MME 122 has been notified of at least one buffered downlink packet addressed to the UE device 200b. For instance, the SWG 124 may buffer the at least one downlink packet 40 addressed to the UE device 200b during the doze mode and notify the MME 122 of the at least one buffered downlink packet 40 so that the MME 122 can send the connection request 114 to the UE device 200b when the UE device 200b executes in the peek mode, e.g., during the maintenance time window 218 of the UE device 200. In response to receiving the connection request 114 from the MME 122 via the serving base station 106b over the paging channel 116, the UE device 200b may execute the normal mode to establish a connection (e.g., RRC-Connected state) with the network 100 to receive the at least one buffered downlink packet 40 addressed to the UE device 200b.

FIG. 1 also shows the data processing hardware 202 of the UE device 200c executing the normal mode. In the normal mode, the UE device 200c has an established connection (e.g., RRC-Connected state) with the serving base station 106a of the network and therefore capable of receiving available downlink packets 40 addressed to the UE device 200c. Accordingly, the base station 106a may deliver/transmit the downlink data packet 40 to the UE device 200c over the air interface 110 of the E-UTRAN 102. Once the data packet 40 is received by the UE device 200c the data processing hardware 202 of the UE device 200c may execute the doze mode. In some examples, the downlink packet 40 addressed to the UE device 200c was buffered by the SGW 124 in the buffer 128 while the UE device 200c was not connected to the network, and then delivered once the UE device 200c enters the normal mode by establishing the connection with the network 100.

Figure 2:
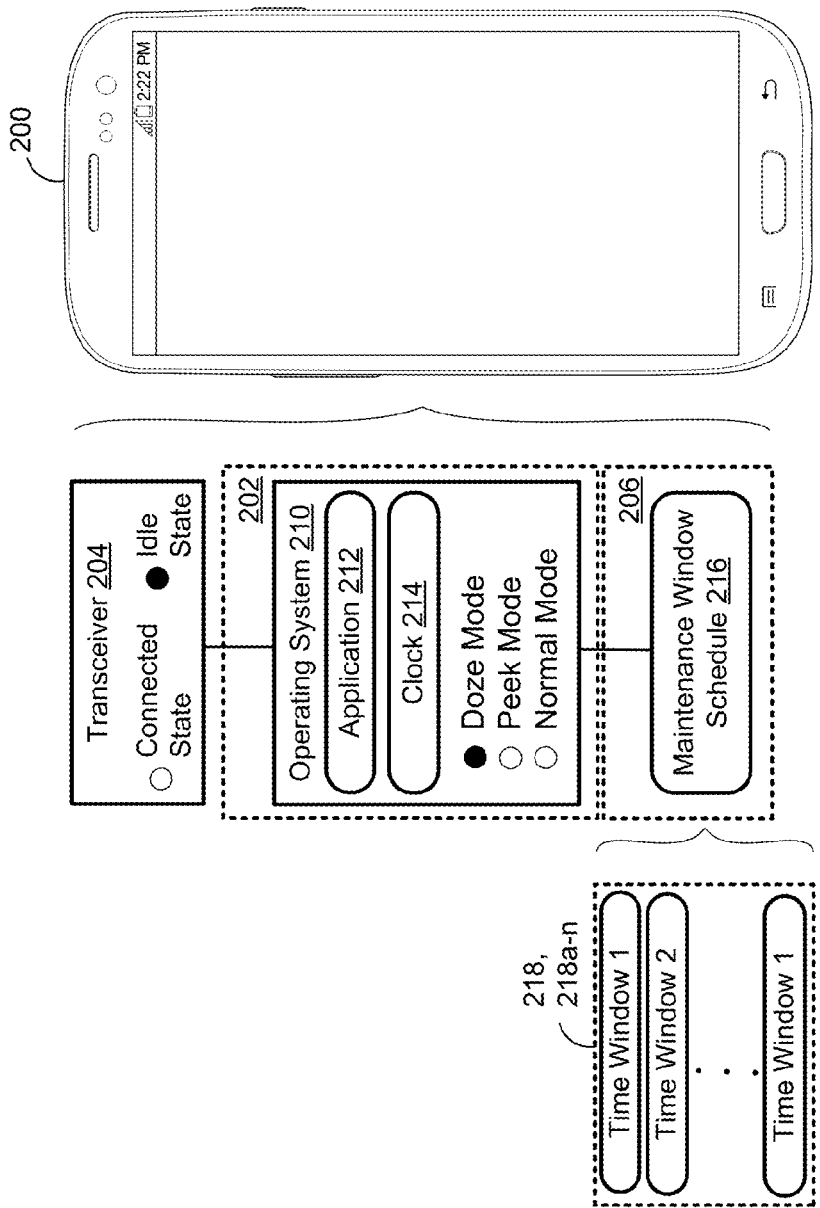
FIG. 2 is a schematic view of an example user equipment (UE) device executable between a doze mode, a peek mode, and a normal mode.

FIG. 2 shows an example UE device 200 having data processing hardware 202, a transceiver 204, and memory hardware 206 in communication with the data processing hardware 202. The data processing hardware 202 may execute between the doze mode, the peek mode, and the normal mode to conserve power consumption at the UE device 200 while maintaining quality of service (QoS). In the example shown, the UE device 200 is a smart phone capable of wireless communication with the base station 106 (eNB) over the air interface 110. The UE device 200 includes a transceiver 204 capable of wirelessly communicating with the base station 106 over the air interface 110 and the data processing hardware 202 executing an operating system 210.

User devices 200 may use a variety of different operating systems 210. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 210 running on the user device 200 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux. User devices 200 operate between the doze mode, the peek mode, and the normal mode while running operating systems 210 other than those operating systems 210 described above, whether presently available or developed in the future.

The transceiver 204 may have a connected state and an idle state. In some examples, the operating system 210 instructs the transceiver 204 to enter the connected state when the UE device 200 enters the normal mode to establish a connection with the network 100 by establishing a communication bearer with the base station 106. Here, the connected state of the transceiver 204 allows the UE device 200 to send/receive data packets 40 to/from the EPC 104 via the established communication bearer with the base station 106. On the other hand, the operating system 210 may instruct the transceiver 204 to enter the idle state when the UE device 200 enters the doze mode to disconnect from the network 100 by releasing the communication bearer from the base station 106. While the UE device 200 can monitor the paging channel 116 during the doze mode when the transceiver 204 is in the idle state, the UE device 200 is consuming less power during the doze mode than in the normal mode since the transceiver 204 and operating system 210 is in a low power mode, whereby the transceiver 204 is not actively connected to a base station 106. Therefore, the UE device 200 consumes less battery power during the doze mode since the transceiver 204 is in the idle state than when the transceiver 204 is in the connected state. Also during operation of the UE device 200 in the doze mode while the transceiver 204 is in the idle state, the data processing hardware 202 is in the low power mode consuming less power than when the data processing hardware 202 is in the normal mode.

In some implementations, the operating system 210 executes a doze mode application 212 that allows the UE device 200 to switch between the doze mode, the peek mode, normal mode based on a maintenance window schedule 216 of maintenance time windows 218, 218*a-n* stored on the memory hardware 206. Each maintenance time window 218 of the maintenance window schedule 216 includes a corresponding time period when the UE device 200 is permitted to receive connection requests 114 over the paging channel 116 to enter the normal mode so the MME 122 can deliver a downstream data packet 40 available for the UE device 200. Here, the application 212 may cause the UE device 200 to switch from the doze mode to the peek mode when a clock 214 at the data processing hardware 202 is within one of the maintenance time windows 218. In some scenarios, the application 212 causes the UE device 200 to revert back to the doze mode when the maintenance time window 218 lapses and no downstream data packet 40 is available for the UE device 200, i.e., no buffered data packets 40 addressed to the UE device 200. In other scenarios, the application 212 causes the UE device 200 to enter the normal mode when a connection request 114 is received over the paging channel 116 indicating that one or more downstream data packet 40 are available (i.e., in the buffer 128) for delivery to the UE device 200.

Moreover, the doze mode application 212 may notify the MME 122 about entering the doze mode and provide the maintenance window schedule 216 of maintenance time windows 218 to the MME 122. Here, the maintenance window schedule 216 allows the MME 122 to only send connection requests 114 to the UE device 200 over the paging channel 116 during any of the maintenance time windows 218. Therefore, when the SGW 124 receives a downstream data packet 40 addressed to the UE device 200 during the doze mode when the clock 214 is not within one of the maintenance time windows 218, the MME 122 may forego sending the connection request 114 to keep the transceiver 204 in the idle state, thereby reducing power consumption at the UE device 200. The SGW 124 may buffer the received downstream data packet 40 addressed to the UE device 200 in the buffer 128. Once the clock 214 is within one of the maintenance time windows 218, the MME 122 sends the connection request 114 over the paging channel 116 to the transceiver 204 to enter the connected state, thereby allowing the UE device 200 to enter the normal mode and receive the buffered downstream data packet 40 from the SGW 124.

Figure 3A:
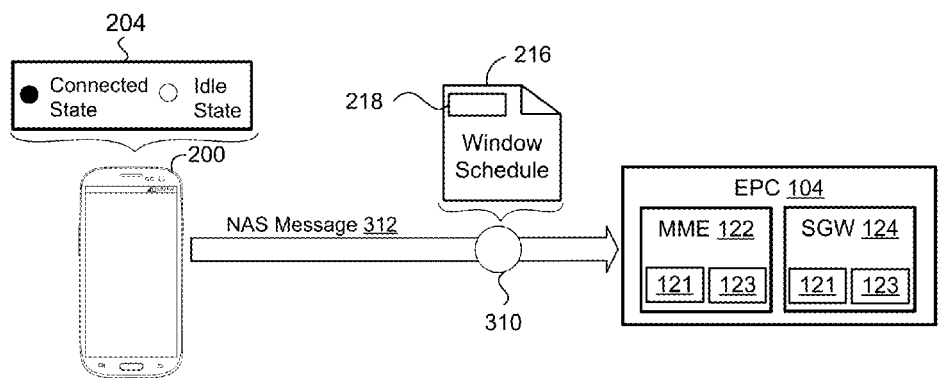
FIG. 3A is a schematic view of an example UE device sending a doze mode notification to a mobility management entity (MME) via a non-access stratum message.
Figure 3B:
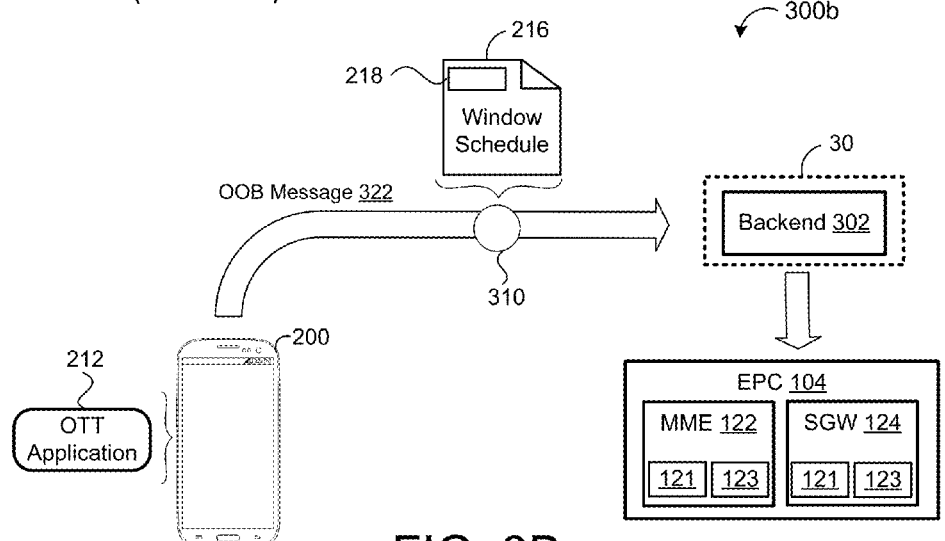
FIG. 3B is a schematic view of an example UE device sending a doze mode notification out-of-band to a MME via an over-the-top message.

Referring to FIGS. 3A and 3B, in some implementations, schematic views 300*a* and 300*b* show a UE device 200 delivering a doze mode notification 310 to the MME 122 about executing the doze mode. Specifically, the UE device 200 sends the doze mode notification 310 to notify the MME 122 and the SGW 124 that the UE device 200 is exiting the normal mode and entering the doze mode. The doze mode notification 310 may identify the UE device 200 and include a doze time period indicating when the UE device 200 will be executing in the doze mode. In some examples, the doze mode notification 310 includes the maintenance window schedule 216 of maintenance time windows 218. Upon receiving the doze mode notification 310, the MME 122 and/or the SGW 124 may store the maintenance window schedule 216 of maintenance time windows 218 in memory hardware 123. Separate memory hardware 123 may reside at each of the MME 122 and the SGW 124, the memory hardware 123 may reside at one of the MME 122 or the SGW 124 and be accessible to the other one of the MME 122 or the SGW 124, or the memory hardware 123 may reside at some other location in communication with the MME 122 and the SGW 124. In some configurations, the MME 122 and the SGW 124 are integrated into a single device sharing data processing hardware 121 and memory hardware 123.

FIG. 3A shows the UE device 200 executing in the normal mode, and therefore having an established connection to the network, before transitioning to the doze mode and delivering the doze mode notification 310 in-band as a non-access stratum (NAS) message 312 to the MME 122. Here, the NAS message 312 is sent over the air interface 110 (FIG. 1) to the serving base station 106 (FIG. 1) and the serving base station 106 provides the NAS message 312 to the MME 122 via the S1 interface 108 (FIG. 1). The transceiver 204 is in the connected state when the UE device 200 delivers the doze mode notification 310 to the MME 122 in-band via the NAS message 312. After delivering the notification 310, the UE device 200 (e.g., data processing hardware 202) may instruct the transceiver 204 to enter the idle state to terminate any connections with the network.

FIG. 3B shows the UE device 200 delivering the doze mode notification 310 as an out-of-band (OOB) message 322 to the MME 122. Here, the UE device 200 executes an over-the-top (OTT) application 212 to deliver the OOB message 322 to a backend 302 of the external network 30 and the external network 30 provides the doze mode notification 310 to the MME 122 and/or the SGW 124. The OTT application 212 and the doze mode application 212 may be the same or different software applications executable on the UE device 200. In response to receiving the notification 310, data processing hardware 121 executing on the SGW 124 may program a classifier 428 (FIGS. 4B-4D) configured to classify received downstream data packets 40 addressed to the UE device 200 as either paging-qualified downstream data packets or non-paging-qualified downlink data packets. As used herein, a paging qualified downlink data packet includes a higher priority over any non-paging-qualified downlink packets. For instance, paging qualified downlink data packets may correspond to incoming calls for the UE device 200 requiring immediate delivery. On the other hand, the MME 122 may forego paging the UE device 200 about non-paging qualified downlink data packets during times outside the maintenance time windows 218 of the maintenance window schedule 216.

Figure 4A:
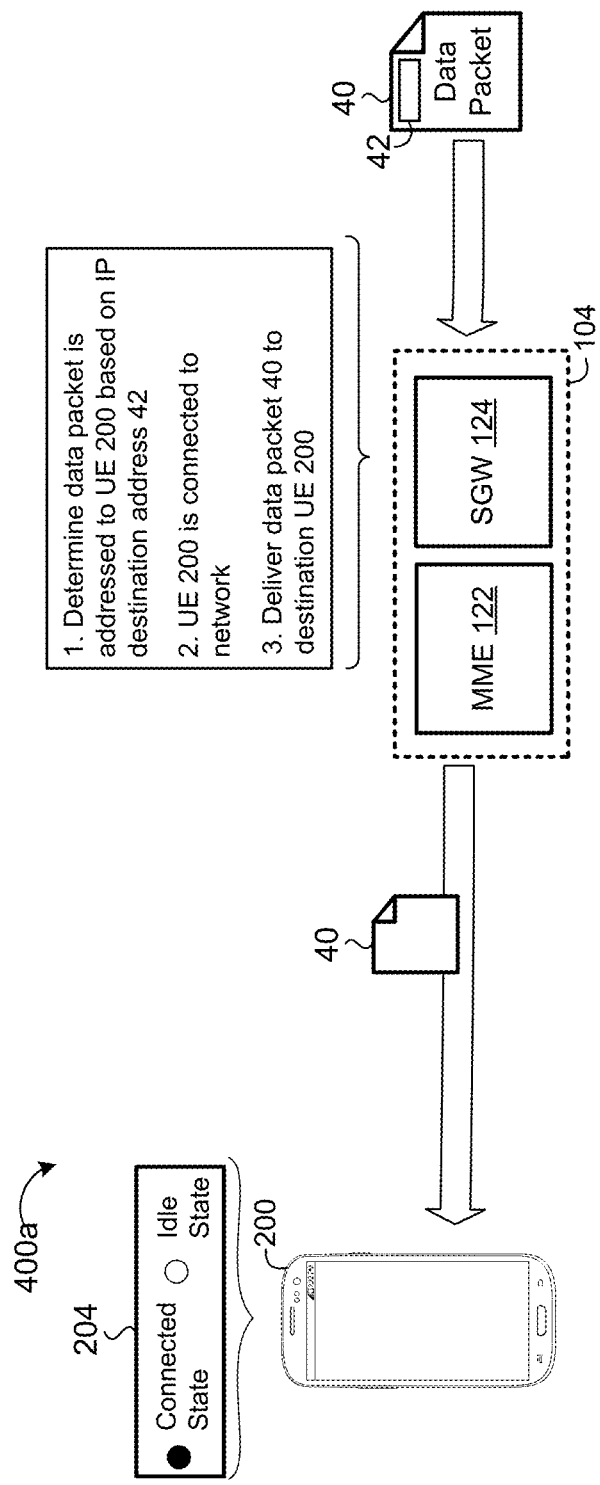
FIG. 4A is a schematic view of an example evolved packet core delivering a downlink data packet addressed to a UE device when the UE device is connected to a network.

Referring to FIGS. 4A-4D, schematic views 400a, 400b, 400c, 400d show the EPC 104 receiving a downlink data packet 40 addressed to the UE device 200 when the UE device 200 is executing between the normal mode, the doze mode, and the peek mode. FIG. 4A shows the SGW 124 at the EPC 104 receiving the downlink data packet 40 (i.e., from the Internet) and determining that the data packet 40 is addressed to the UE device 200 based on an IP destination address 42 associated with the data packet 40. The SGW 124 determines whether the UE device 200 is connected to the network 100. When the SGW 124 determines the UE device 200 is connected to the network 100, the SGW 124 delivers the data packet 40 to the UE device 200, i.e., the serving base station 106 (FIG. 1) receives the data packet 40 addressed to the UE device 200 from the EPC 104 and delivers/transmits the data packet 40 to the UE device 200 via the air interface 110 (FIG. 1).

Figure 4B:
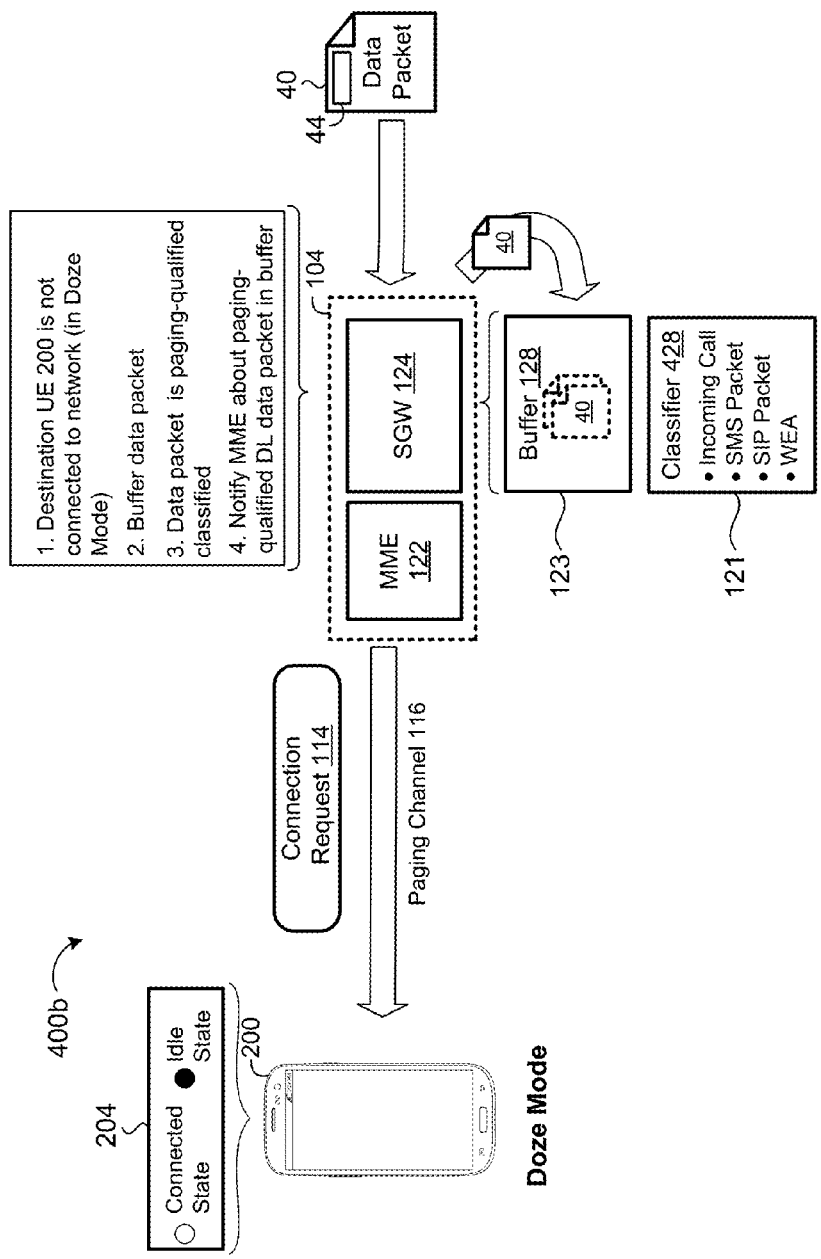
FIG. 4B is a schematic view of an example evolved packet core sending a connection request to a UE device not connected to a network when a downlink data packet addressed to the UE device is paging-qualified classified.
Figure 4C:
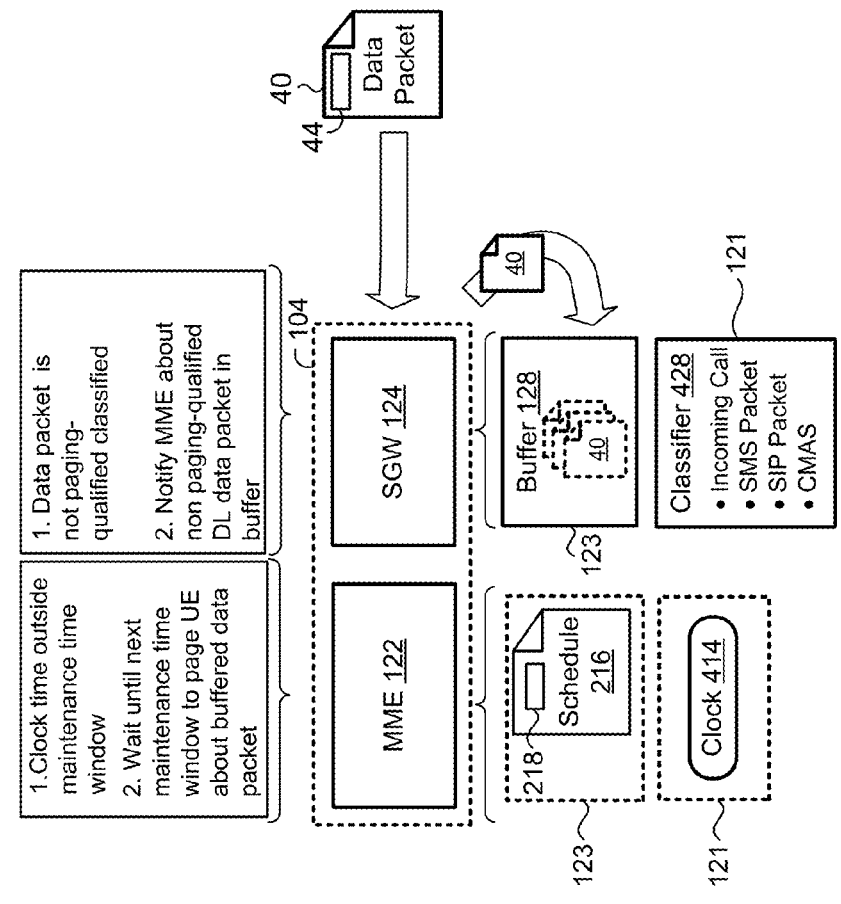
FIG. 4C is a schematic view of an example evolved packet core foregoing sending a connection request to a UE device not connected to a network when a clock time is outside a maintenance time window of the UE device.
Figure 4D:
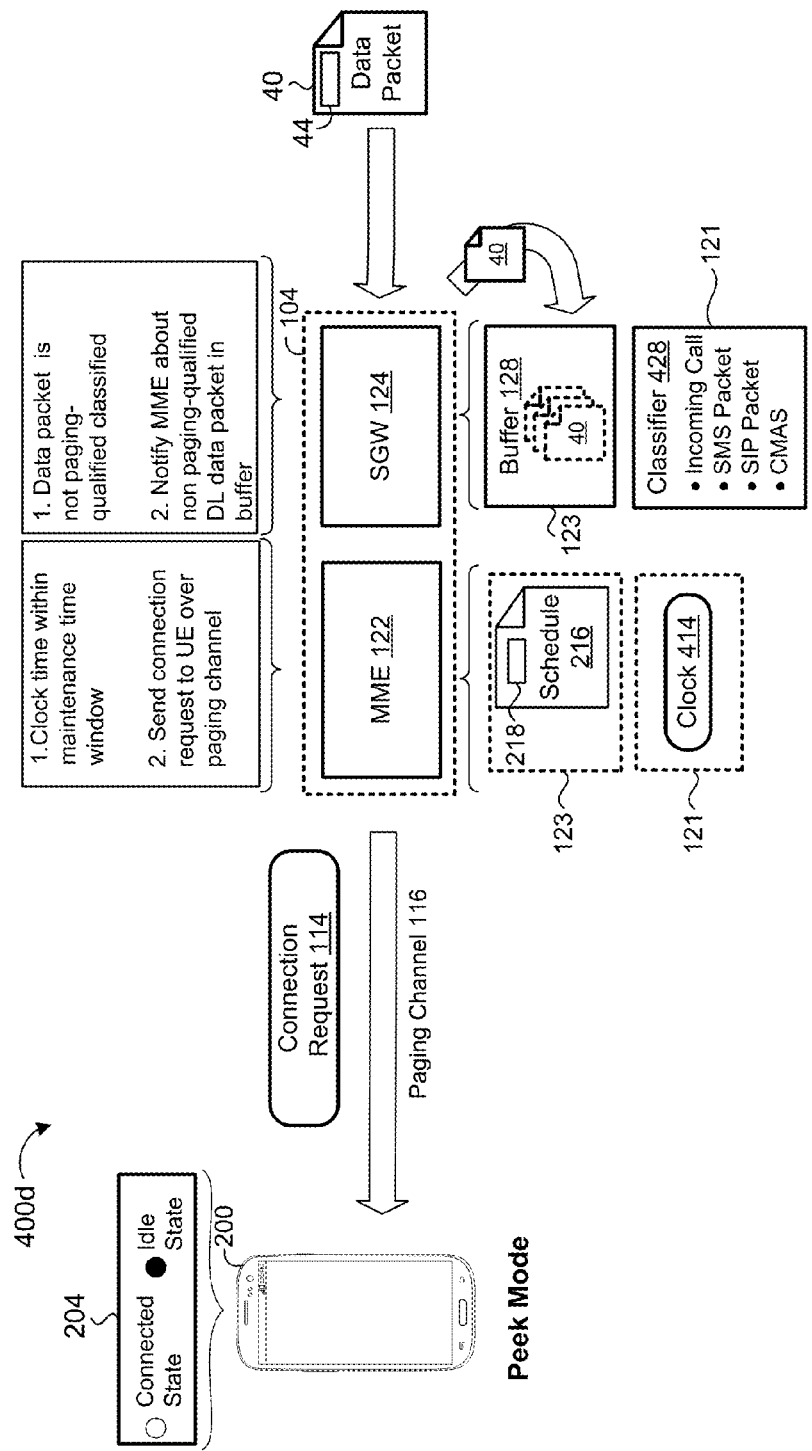
FIG. 4D is a schematic view of an example evolved packet core sending a connection request to a UE device not connected to a network when a clock time is within a maintenance time window of the UE device.

Referring to FIGS. 4B-4D, in some implementations, the SGW 124 receives the downlink data packet 40 addressed to the UE device 200 and determines that the UE device 200 is not connected to the network 100, i.e., the UE device 200 is in the doze mode or the peek mode. Here, the transceiver 204 is in the idle state to conserve battery power. In some examples, the SGW 124 and/or the MME 122 access the memory hardware 123 to obtain the doze time period for a previously received doze mode notification 310 from the UE device 200 to determine that the UE device 200 is not connected to the network 100. Since the UE device 200 does not have an established connection to the network 100, the SGW 124 buffers the downlink data packet 40 addressed to the UE device 200 in the memory hardware 123. For instance, the SGW 124 may route the downlink data packet 40 to a corresponding buffer 128 associated with the UE device 200.

Thereafter, the classifier 428 executing on the data processing hardware 121 of the SGW 124 determines whether the data packet 40 addressed to the UE device 200 is paging-qualified classified. As used herein, the term "paging-qualified classified" refers to paging-qualified data packets having the higher priority than any non-paging-qualified data packets. In some examples, the SGW 124 executes a corresponding classifier 428 for each UE device 200 the SGW 124 serves. Accordingly, each classifier 428 may include a corresponding set of packet types 44 indicating data packets 40 that require a timely communication to the corresponding UE device 200. In the example shown, the classifier 428 determines received data packets 40 associated with incoming calls are paging-qualified classified. Here, the classifier 428 may specify that any received data packets 40 addressed to the UE device 200 having a packet type 44 that includes a Short Message Service (SMS) packet or a Session Initiation Protocol (SIP) control packet for notifying the UE device 200 of an incoming call are deemed paging-qualified classified. Additionally or alternatively, the classifier 428 may indicate that all wireless emergency alert (WEA) packets are paging-qualified classified.

In some implementations, the data processing hardware 121 of the SGW 124 executes an application programming interface (API) to allow the classifier 428 to be programmable. Here, the classifier 428 for a UE device 200 may be installed on a specific SGW 124 in response to the SGW 124 servicing that UE device 200. The classifier 428 may be identifiable by a device profile associated with the UE device 200 and/or a device identifier of the UE device 200. In some examples, the classifier 428 corresponding to each UE device 200 serviced by the SGW 124 is identifiable by an international mobile equipment identify (IMEI) of the UE device 200.

After buffering the received downlink data packet 40 addressed to the UE device 200, FIG. 4B shows the classifier 428 determining that the buffered data packet 40 is paging-qualified classified. Accordingly, classifier 428 determines that the buffered data packet 40 addressed to the UE device 200 requires immediate delivery, and therefore, the SGW 124 notifies the MME 122 to immediately send the connection request 114 to the UE device 200 over the paging channel 116. As the UE device 200 is in the doze mode with the transceiver 204 in the idle state, the connection request 114 causes the UE device 200 (i.e., data processing hardware 202) to exit the doze mode and enter the normal mode to enable delivery of the buffered data packet 40 from the buffer 128. Upon establishing a connection with the serving base station 106 of the network 100, the MME 122 and/or the SGW 124 may be notified upon the UE device 200 establishing the connection with the network 100.

On the other hand, FIGS. 4C and 4D show the classifier 428 at the SGW 124 determining that the buffered data packet 40 is not paging-qualified classified, and therefore, does not require immediate delivery to the UE device 200. Accordingly, the MME 122 will only page the UE device 200 to wake-up when a clock time 414 of the data processing hardware 121 is within a maintenance time window 218 of a maintenance window schedule 216 stored in the memory hardware 123. The SGW 124 may notify the MME 122 about the at least one buffered downlink packet 40 addressed to the UE 200. When notifying the MME 122, the SGW 124 may specify that the at least one buffered downlink data packet 40 is not paging-qualified classified, i.e., a non-paging-qualified data packet 40.

Referring to FIG. 4C, the MME 122 compares the clock time 414 to the maintenance time windows 218 of the maintenance window schedule 216 and determines that the clock time 418 is outside the maintenance time windows 218 of the UE device 200. Accordingly, the MME 122 will forego notifying the UE device 200 about the at least one buffered data packet 40 available for the UE device 200 until the clock time 414 is within the next maintenance time window 218, i.e., when the UE device 200 enters the peek mode. In some scenarios, the UE device 200 exiting the doze mode and entering the normal mode to establish the connection with the network 100 causes the SGW 124 to deliver any data packets 40 available for the UE device 200 from the buffer 128.

FIG. 4D shows the MME 122 comparing the clock time 414 to the maintenance time windows 218 of the maintenance window schedule 216 and determining that the clock time 414 is within a maintenance time window 218 of the UE device 200. Here, the MME 122 is allowed to notify the UE device 200 about the at least one buffered data packet 40 available for the UE device 200 since the UE device 200 has entered the peek mode. Accordingly, the MME 122 sends the connection request 114 to the UE device 200 over the paging channel 116. As the UE device 200 is in the peek mode with the transceiver 204 in the idle state to conserve battery power, the connection request 114 causes the UE device 200 (i.e., data processing hardware 202) to exit the peek mode and enter the normal mode to enable delivery of the at least one buffered data packet 40 from the buffer 128. Upon establishing a connection with the serving base station 106 of the network 100, the MME 122 and/or the SGW 124 may be notified upon the UE device 200 establishing the connection with the network 100.

Figure 5:
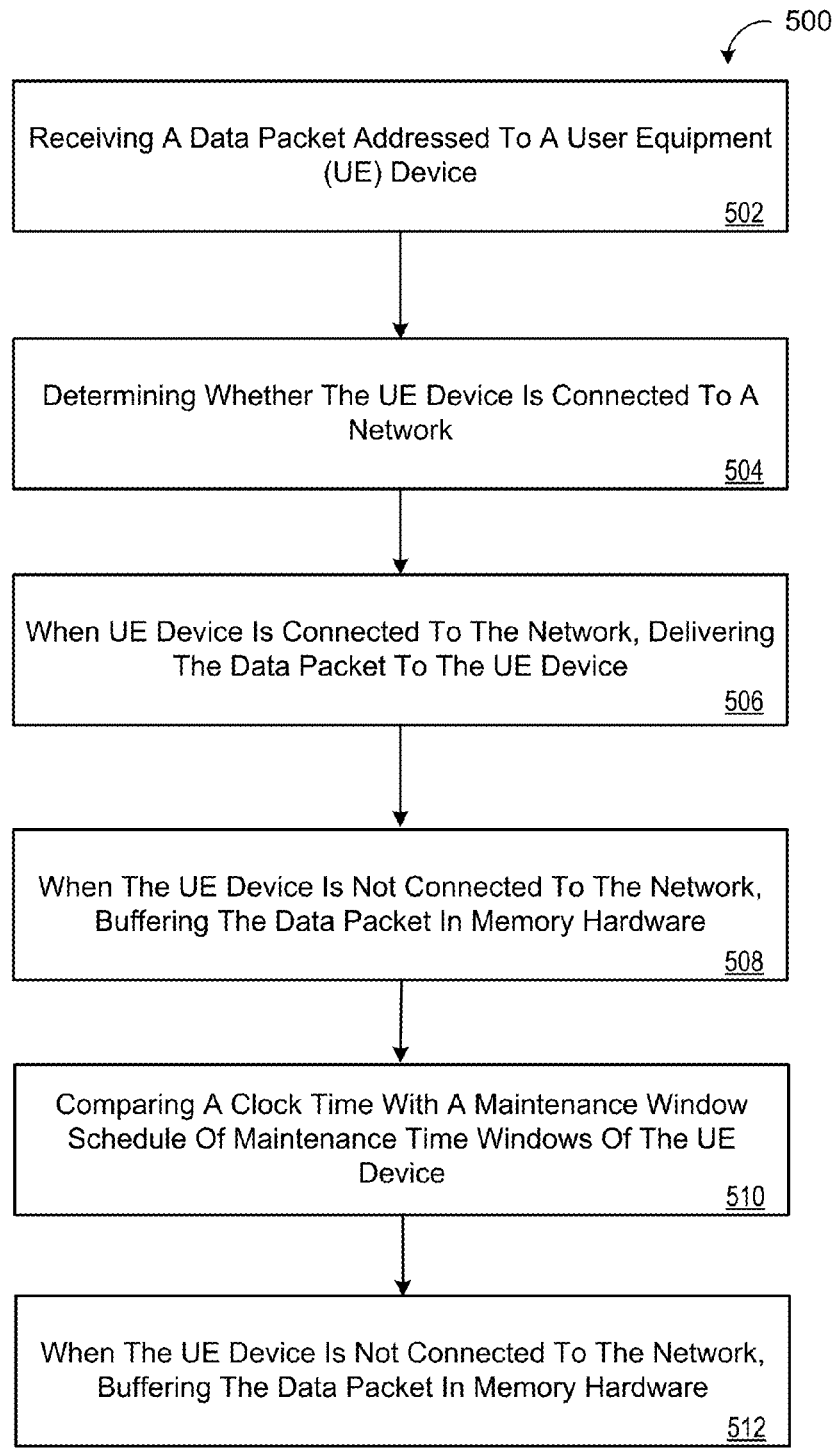
FIG. 5 is a flowchart of an example method for transmitting a connection request to a UE device not connected to a network.

FIG. 5 is a flowchart 500 of an example method for transmitting a connection request to a UE device 200 over a paging channel of a network 100 when the UE device 200 is not connected to the network 100. The flowchart 500 starts at operation 502 where data processing hardware 121 at a component 120 of an evolved packet core (EPC) 104 receives a data packet 40 addressed to the UE device 200. The data packet 40 may be received at a PGW 126 of the EPC 104 from an external network 30 (e.g., the Internet) and may include an IP destination address 42 associated with the UE device 200. At operation 504, the data processing hardware 121 determines whether the UE device 200 is connected to the network 100. The UE device 200 may notify the data processing hardware 121 (e.g., at the MME 122) when executing a normal mode (e.g., RRC-Connected) upon establishing a connection with the network 100. At operation 506, when the UE device 200 is connected to the network 100, the data processing hardware 121 delivers the data packet 40 to the UE device 200. For instance, the EPC 104 may provide the data packet 40 over the S1 Interface 108 to a base station 106 servicing the UE device 200, and the servicing base station 106 may transmit the data packet 40 to the UE device 200 over the air interface 110.

At operation 508, when the UE device 200 is not connected to the network 100 (e.g., the UE device 200 is in the doze mode or the peek mode), the data processing hardware 121 buffers the data packet 40 in memory hardware 123 in communication with the data processing hardware, and at operation 510, compares a clock time 414 of the data processing hardware with a maintenance window schedule of maintenance time windows of the UE device 200. In some examples, the UE device 200 sends a doze mode notification 310 to the data processing hardware about executing the doze mode. The notification 310 may include the doze time period of the doze mode and/or the maintenance window schedule 216 of maintenance time windows 218 where the data processing hardware 121 (e.g., at the MME 122) is permitted to page the UE device 200.

At operation 512, the data processing hardware 121 transmits a connection request 114 to the UE device 200 over a paging channel 116 when the clock time 414 is within a maintenance time window 218 of the UE device 200. The received connection request 114 causes the UE device 200 to establish a connection to the network 100. For instance, an operating system 210 of the UE device 200 may instruct a transceiver 204 of the UE device 200 to enter the connected state to establish a communication bearer with a servicing base station 106 of the network 100. In some examples, once the UE device 200 establishes the connection with the network 100, the SGW 124 at the EPC 104 retrieves the data packet 40 addressed to the UE 200 from the buffer 128 of the memory hardware 123 and delivers the data packet 40 to the UE 200. For instance, the SGW 124 may provide the data packet 40 over the S1 Interface 108 to the base station 106 servicing the UE device 200, and the servicing base station 106 may transmit the data packet 40 to the UE device 200 over the air interface 110.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
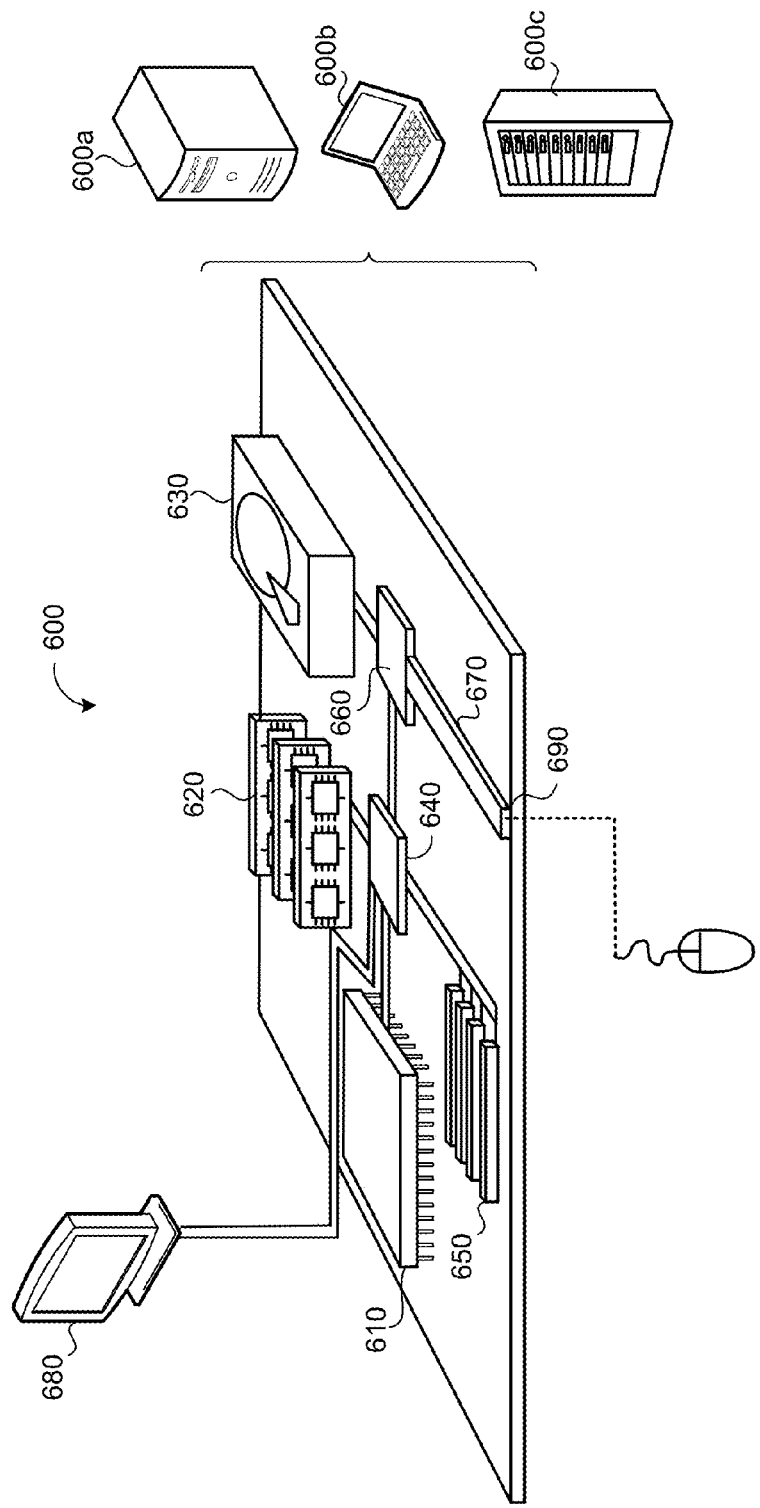
FIG. 6 is a schematic view of an example computing device.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware 202, 121), memory 620 (e.g. memory hardware 206, 123), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    executing data processing hardware of user equipment (UE) in a doze mode, a peek mode, and a normal mode, the data processing hardware being in communication with a transceiver having a connected state and an idle state, wherein the doze mode comprises:
notifying a mobility management entity (MME) system about executing the doze mode by delivering a non-access stratum message to the MME system indicating that the transceiver is about to enter the idle state;
terminating any connections with a network by instructing the transceiver to enter the idle state, thereby ceasing any communication operations;
comparing a clock time of the data processing hardware with a maintenance window schedule of maintenance time windows; and
when the clock time is within a maintenance time window of the maintenance window schedule, executing the peek mode,
wherein the peek mode comprises:
receiving a connection request from the MME system when the MME system has been notified of at least one buffered downlink packet addressed to the UE device; and
in response to receiving the connection request, executing the normal mode, and
wherein the normal mode comprises:
establishing a connection to the network;
receiving the at least one buffered downlink packet; and
when the at least one buffered downlink packet has been received and the maintenance time window has lapsed, executing the doze mode.

2. The method of claim 1, wherein notifying the MME system about executing the doze mode comprises executing an over-the-top (OTT) application to deliver an out-of-band message to the MME system about executing the doze mode.

3. The method of claim 1, wherein notifying the MME system about executing the doze mode comprises delivering a doze mode notification to the MME system about executing the doze mode, the doze mode notification comprising the maintenance window schedule of maintenance time windows.

4. The method of claim 1, wherein the at least one buffered downlink packet is buffered by a serving gateway (SGW) or the MME system during the doze mode.

5. A method comprising:
executing data processing hardware of user equipment (UE) in a doze mode, a peek mode, and a normal mode,
wherein the doze mode comprises:
terminating any connections with a network;
comparing a clock time of the data processing hardware with a maintenance window schedule of maintenance time windows;
when the clock time is within a maintenance time window of the maintenance window schedule, executing the peek mode;
monitoring a paging channel for any paging-qualified downlink packets available for the UE, wherein a paging-qualified downlink packet has a higher priority over any non-paging-qualified downlink packets and causes the MME system to transmit the connection request to the UE over the paging channel; and
in response to receiving a connection request over the paging channel to receive the paging-qualified downlink packet, executing the normal mode,
wherein the peek mode comprises:
receiving a connection request from a mobility management entity (MME) system when the MME system has been notified of at least one buffered downlink packet addressed to the UE device; and
in response to receiving the connection request, executing the normal mode, and
wherein the normal mode comprises:
establishing a connection to the network;
receiving the at least one buffered downlink packet; and
when the at least one buffered downlink packet has been received and the maintenance time window has lapsed, executing the doze mode.

6. A user equipment (UE) device comprising:
a transceiver having a connected state and an idle state;
data processing hardware in communication with the transceiver; and
memory hardware in communication with the data processing hardware, the memory hardware storing a maintenance window schedule of maintenance time windows and instructions that when executed on the data processing hardware cause the data processing hardware to perform operations comprising executing the data processing hardware in a doze mode, a peek mode, and a normal mode,
wherein the doze mode comprises:
notifying a mobility management entity (MME) system about executing the doze mode by delivering a non-access stratum message to the MME system indicating that the transceiver is about to enter the idle state;
terminating any connections with a network by instructing the transceiver to enter the idle state, thereby ceasing any communication operations;
comparing a clock time of the data processing hardware with the maintenance window schedule of maintenance time windows; and
when the clock time is within a maintenance time window of the maintenance window schedule, executing the peek mode,
wherein the peek mode comprises:
receiving a connection request from the MME system when the MME system has been notified of at least one buffered downlink packet addressed to the UE device; and
in response to receiving the connection request, executing the normal mode, and
wherein the normal mode comprises:
establishing, by the transceiver, a connection to the network;
receiving the at least one buffered downlink packet; and
when the at least one buffered downlink packet has been received and the maintenance time window has lapsed, executing the doze mode.

7. The UE device of claim 6, wherein notifying the MME system about executing the doze mode comprises executing an over-the-top (OTT) application to deliver an out-of-band message to the MME system about executing the doze mode.

8. The UE device of claim 6, wherein notifying the MME system about executing the doze mode comprises delivering a doze mode notification to the MME system about executing the doze mode, the doze mode notification comprising the maintenance window schedule of maintenance time windows.

9. The UE device of claim 6, wherein the at least one buffered downlink packet is buffered by a serving gateway (SGW) or the MME system during the doze mode.

10. A user equipment (UE) device comprising:
a transceiver;
data processing hardware in communication with the transceiver; and
memory hardware in communication with the data processing hardware, the memory hardware storing a maintenance window schedule of maintenance time windows and instructions that when executed on the data processing hardware cause the data processing hardware to perform operations comprising executing the data processing hardware in a doze mode, a peek mode, and a normal mode,
wherein the doze mode comprises:
  terminating any connections with a network;
  comparing a clock time of the data processing hardware with the maintenance window schedule of maintenance time windows;
  when the clock time is within a maintenance time window of the maintenance window schedule, executing the peek mode;
  monitoring a paging channel for any paging-qualified downlink packets available for the UE, wherein a paging-qualified downlink packet has a higher priority over any non-paging-qualified downlink packets and causes the MME system to transmit the connection request to the UE over the paging channel; and
  in response to receiving a connection request over the paging channel to receive the paging-qualified downlink packet, executing the normal mode,
wherein the peek mode comprises:
  receiving a connection request from a mobility management entity (MME) system when the MME system has been notified of at least one buffered downlink packet addressed to the UE device; and
  in response to receiving the connection request, executing the normal mode, and
wherein the normal mode comprises:
  establishing, by the transceiver, a connection to the network;
  receiving the at least one buffered downlink packet; and
  when the at least one buffered downlink packet has been received and the maintenance time window has lapsed, executing the doze mode.

11. A method comprising:
receiving, at data processing hardware of a network, a data packet addressed to a user equipment (UE) device;
determining, by the data processing hardware, whether the UE device is connected to the network;
when the UE device is connected to the network, delivering, by the data processing hardware, the data packet to the UE device; and
when the UE device is not connected to the network:
  buffering, by the data processing hardware, the data packet in memory hardware in communication with the data processing hardware;
  comparing a clock time of the data processing hardware with a maintenance window schedule of maintenance time windows of the UE device;
  when the clock time is within a maintenance time window of the UE device, transmitting a connection request to the UE device over a paging channel, the connection request causing the UE device to establish a connection to the network;
  determining, by the data processing hardware, whether the data packet addressed to the UE device is paging-qualified classified, wherein the data packet addressed to the UE device is paging-qualified classified when the data packet comprises a standard initiation protocol packet addressed to the UE device or a standard messaging service packet addressed to the UE device; and
  when the data packet addressed to the UE device is paging-qualified classified, transmitting the connection request to the UE device over the paging channel.

12. The method of claim 11, further comprising, when the data packet addressed to the UE device is not paging-qualified classified and the clock time is outside the maintenance time window of the UE device, ceasing any communications with the UE device over the paging channel.

13. The method of claim 11, further comprising receiving, at the data processing hardware, a doze mode notification from the UE device, the doze mode notification indicating that the UE device is entering a doze mode that causes the UE device to terminate any connections with the network for a doze period of time.

14. The method of claim 13, wherein receiving the doze mode notification from the UE device comprises:
receiving the maintenance window schedule of maintenance time windows from the UE device; and
storing the maintenance window schedule of maintenance time windows in the memory hardware.

15. A method comprising:
receiving, at data processing hardware, a doze mode notification from a user equipment (UE) device, the doze mode notification indicating that the UE device is entering a doze mode that causes the UE device to terminate any connections with a network for a doze period of time;
receiving, at the data processing hardware, a data packet addressed to the UE device;
determining, by the data processing hardware, whether the UE device is connected to the network;
when the UE device is connected to the network, delivering, by the data processing hardware, the data packet to the UE device; and
when the UE device is not connected to the network:
  buffering, by the data processing hardware, the data packet in memory hardware in communication with the data processing hardware;
  determining, by the data processing hardware, whether the data packet is paging-qualified classified;
  when the data packet is paging-qualified classified, transmitting, by the data processing hardware, a connection request to the UE device over a paging channel, the connection request causing the UE device to exit the doze mode and enter a normal mode during which the UE device establishes a connection to the network; and
  when the data packet is not paging-qualified classified:
    comparing a clock time of the data processing hardware with a maintenance window schedule of maintenance time windows of the UE device; and
    when the clock time is within a maintenance time window of the UE device, transmitting the connection request to the UE device over the paging channel.

16. The method of claim 15, further comprising, when the data packet addressed to the UE device is not paging-qualified classified and the clock time is outside the maintenance time window of the UE device, ceasing any communications with the UE device over the paging channel.

17. The method of claim 15, wherein the data packet addressed to the UE device is paging-qualified classified when the data packet is indicative of an incoming call for the UE device.

18. The method of claim 15, wherein receiving the doze mode notification from the UE device comprises receiving a non-access stratum message from the UE device through the network, the non-access stratum message comprising the doze mode notification.

19. The method of claim 15, wherein receiving the doze mode notification from the UE device comprises receiving an out-of-band message from an over-the-top (OTT) application executing on the user device, the out-of-band message comprising the doze mode notification.

20. The method of claim 15, wherein receiving the doze mode notification from the UE device comprises:

receiving the maintenance window schedule of maintenance time windows from the UE device; and storing the maintenance window schedule of maintenance time windows in the memory hardware.

* * * * *